UNITED STATES PATENT OFFICE.

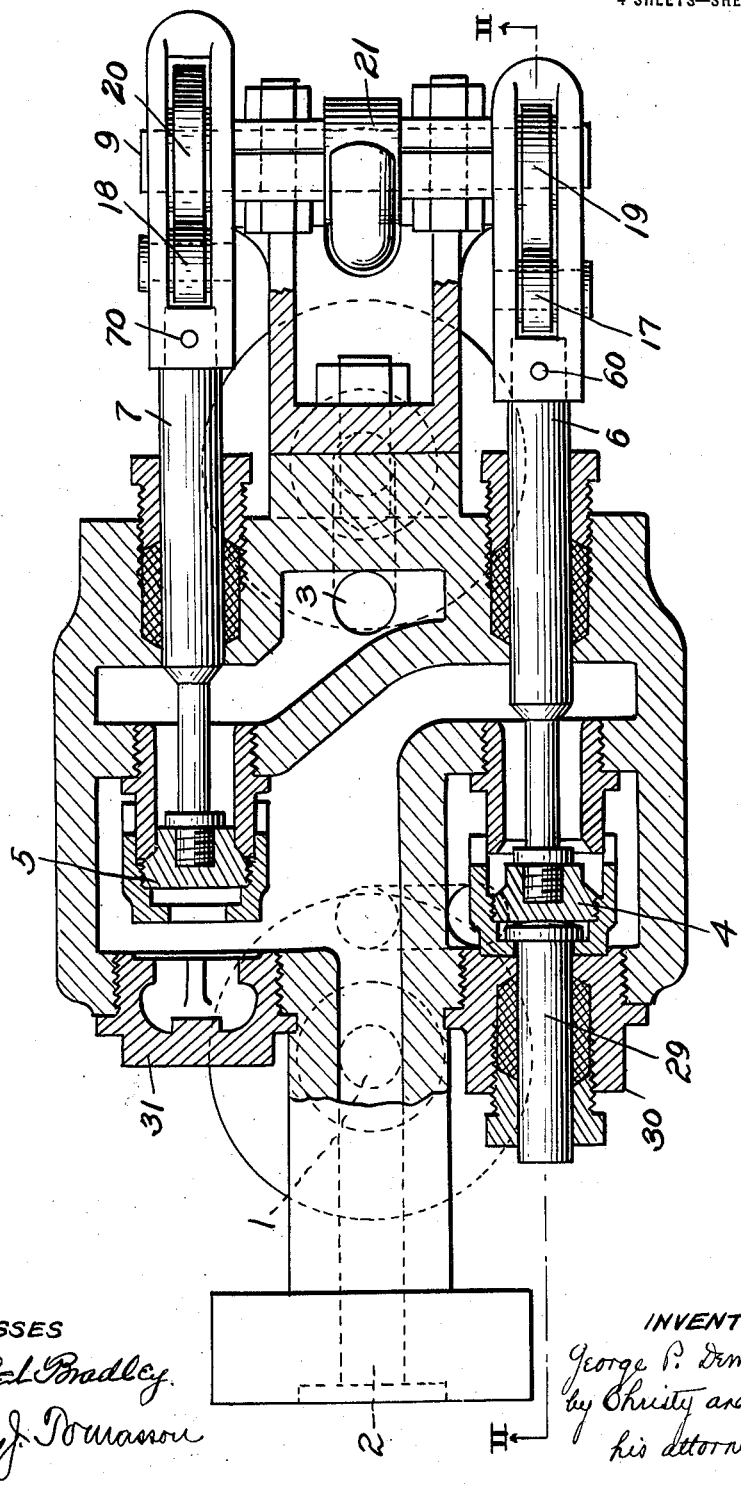

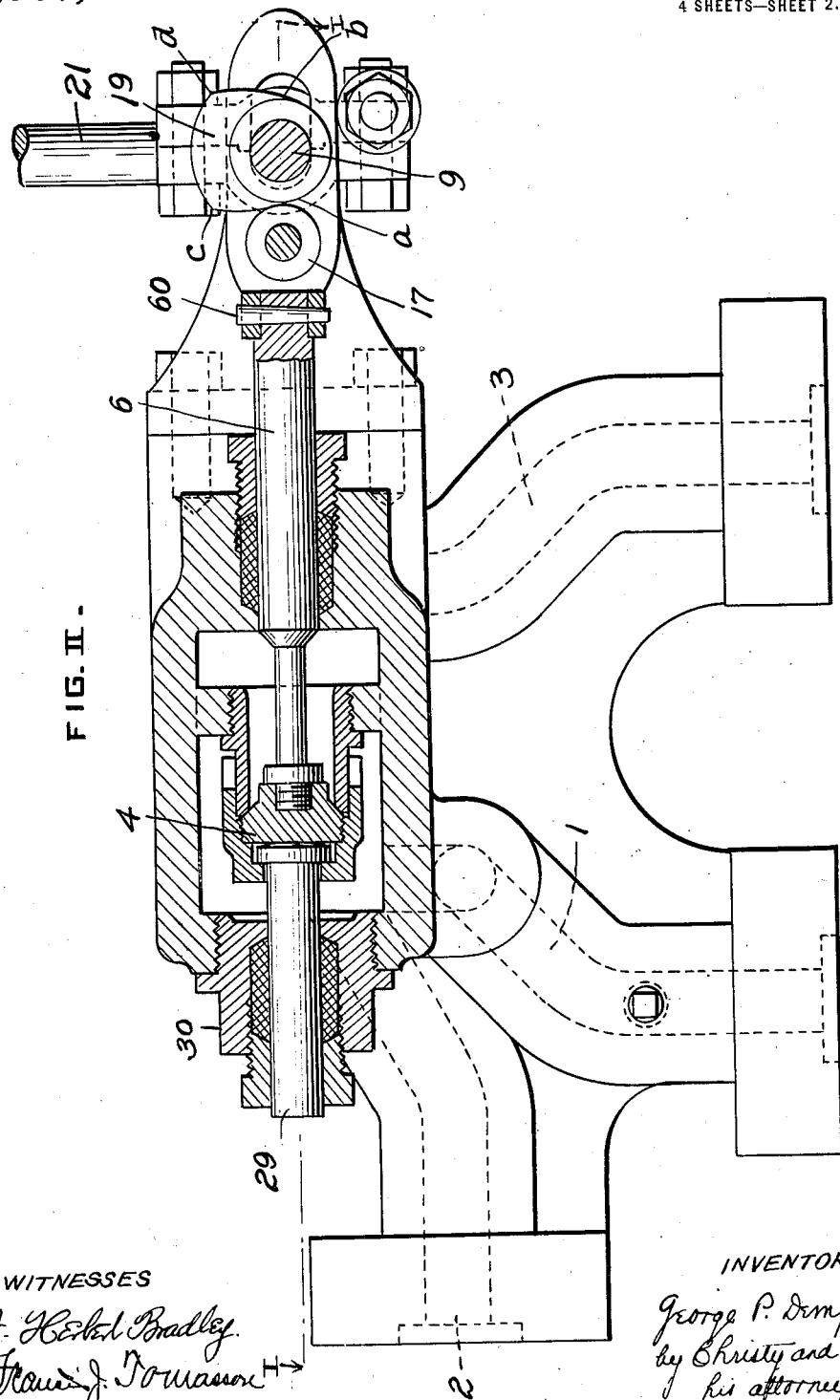

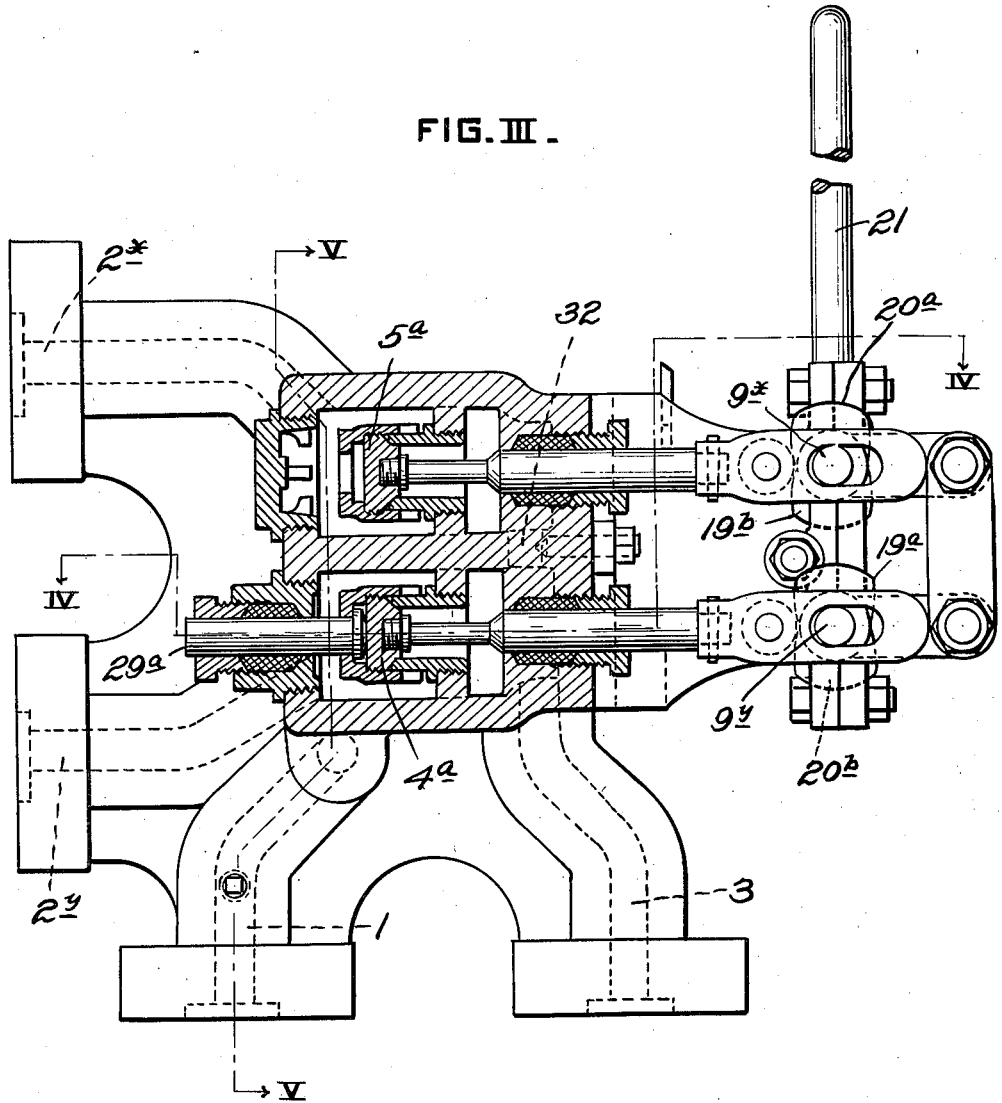

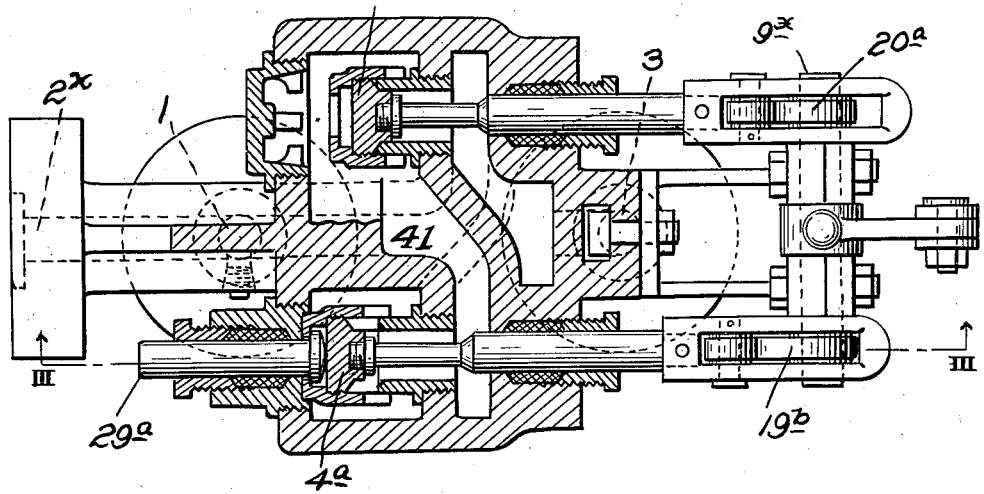
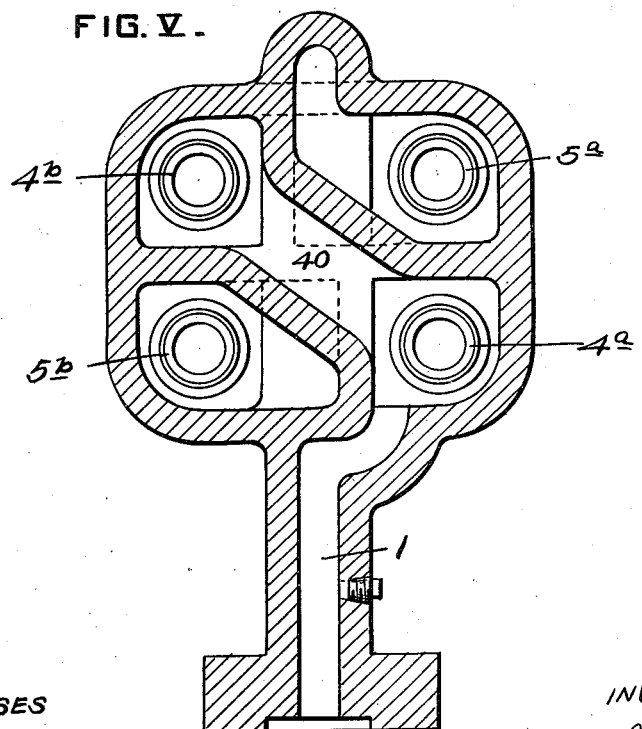

GEORGE P. DEMPLER, OF PITTSBURGH, PENNSYLVANIA, ASSIGNOR TO PROTECTED SEAT VALVE COMPANY, OF PITTSBURGH, PENNSYLVANIA, A CORPORATION OF PENNSYLVANIA.

VALVE.

1,387,841. Specification of Letters Patent. Patented Aug. 16, 1921.

Application filed July 3, 1920. Serial No. 393,864.

*To all whom it may concern:*

Be it known that I, GEORGE P. DEMPLER, residing at Pittsburgh, in the county of Allegheny and State of Pennsylvania, a citizen of the United States, have invented or discovered certain new and useful Improvements in Valves, of which improvements the following is a specification.

My invention relates to valves, and more particularly to valve mechanisms for controlling the flow of water to and from hydraulic cylinders. I shall show and describe it in that particular application, but it will be understood that certain features are of wider and more general applicability.

In the accompanying drawings, Figure 1 is a view in horizontal section of a valve structure embodying my present invention, and Fig. II is a vertical section of the same structure. The plane of section of Fig. I is indicated by the line I—I, Fig. II, and that of Fig. II by the line II—II, Fig. I. Fig. III is a view in vertical section of a valve structure of different adaptability and capacity, but still embodying my invention. Fig. IV is a view in horizontal section of the structure shown in Fig. III, the plane of section being indicated by the line IV—IV, Fig. III; and Fig. V is a view in transverse section, on the line V—V, Fig. III. The plane of section of Fig. III is indicated by the line III—III, Fig. IV.

The structure of Figs. I and II is a three-way valve for operating an hydraulic cylinder; that of Figs. III–V is a four-way valve. The three-way valve is applicable to a cylinder whose piston is impelled in one direction only to perform work, the return stroke not being under power, and serving merely to empty the cylinder and to bring the piston back to position for the ensuing power stroke; the four-way valve is applicable to a cylinder whose piston is driven first in one direction and then in the other, and under power in both cases, to perform work on each traverse. I shall first describe the structure of Figs. I and II, and then point out the elaborations and adaptations involved in producing the four-way valve of Figs. III–V.

In a companion application of Charles A. Borchert and Michael G. O'Neil, filed September 17, 1920, Serial No. 410,982, a valve structure for hydraulic cylinders is shown and described. My present invention is an improvement upon the structure of that application.

Referring to Figs. I and II, the valve structure there shown consists essentially of a casing into which leads an inlet passage 1 and from which open a cylinder passage 2 and a relief or waste passage 3. Two valves, 4 and 5, are arranged within the casing; valve 4 controls communication from inlet to cylinder; valve 5 controls communication from cylinder to waste passage. Both valves normally seat themselves, and means are provided to open them singly, either one or the other, as the need may be, to admit water under the existing head to the cylinder, or to allow water to pass from the cylinder to the waste, that the piston of the cylinder once raised may descend.

The valves are operated by stems 6 and 7 which extend through the valve casing, and the means for operating the valves in the desired correlation consist of a pair of cams 19 and 20 borne on a shaft 9, and engaging, as shaft 9 turns, thrust rollers 17 and 18 borne by valve stems 6 and 7. The cams are so placed that they come into play in sequence, and with an interval between, so that, one valve being open, it will close again before the other valve opens.

The turning of shaft 9 is controlled by a hand lever 21.

The cams are formed with opposite areas $a$—$b$ and $c$—$d$ of curvature concentric with the shaft, one of these areas, $a$—$b$, being low, and the other, $c$—$d$, high. These areas are connected by intermediate areas, $b$—$d$ and $a$—$c$, of gradually increasing radius. When the low area, $a$—$b$, is disposed opposite a thrust roller 17 or 18, the corresponding valve is free of restraint and seated; when the high area $c$—$d$ is so brought opposite the thrust roller, the valve is held open; as the cam turns and the roller rolls over surface $a$—$c$, the valve is gradually raised from its seat. By this construction the valve may be raised and sustained by continued hand pressure on lever 21, or by a further turning the valve may be set and held open by mechanical means only, and when once the valve is so set open, it requires but an easy turning of the lever to release the engagement of cam and roller and allow the valve to come promptly to its seat.

As shown in Fig. I valve 4 is open and valve 5 closed. The lever 21 is then in advanced position; retraction of the lever to intermediate position will release valve 4 and allow it to close while valve 5 remains closed. Further backward shifting of lever 21 will effect the opening of valve 5. It is impossible to open both valves at one time; and, one valve being open, it must close before the other can be opened. Or, both being closed, either may at will be opened, though not both together. Fig. II shows the lever 21 in intermediate position, and both valves closed.

Valve 4, the inlet control valve, is so far balanced that it may, in spite of great head of water to which it may be subject, be readily moved from closed to open position by such a hand lever as shown, and, once opened, it may when relieved of restraint of the cam operating mechanism, come immediately and promptly to its seat. To this end a balancing stem 29 extends from valve 4 on opposite side from stem 6; it extends across the water passageway and into an opening in the opposite casing wall formed to receive it, and of course it is in its passage through this casing wall suitably packed.

The features thus far indicated are all of them present in the valve structure of the Borchert and O'Neil application alluded to. It remains now to note and explain the features which distinguish my valve structure from that of the application mentioned, the features namely which characterize my present invention.

Comparing the structure of the Bochert and O'Neil application alluded to with this, it will be observed that, whereas in Bochert and O'Neil the two valves arranged side by side and in parallelism lie in a common plane with inlet and cylinder and outlet passageways, in the arrangement of my present application the plane in which the two valves lie and move is transverse to the plane in which the passageways are disposed. It follows that in my present arrangement the valves are more readily accessible for purposes of replacement and repair.

Removable closures 30 and 31 are provided in the casing wall, opposite and in axial alinement with valves 4 and 5, through which access may be had, for the purposes just stated. Through the closure 30 the balancing stem 29 of valve 4 may extend, as Fig. I shows.

In order to make effective this desirable feature, the whole valve-operating apparatus is reversed, and the valves, instead of being pulled from their seats by tension stems on the intake side, are pushed from their seats by thrust stems on the outgo side. The thrust roller upon which the cams act are arranged between cam and valve, and not as in the construction alluded to, where the cam is between valve and thrust roller. And the balancing stem 29, instead of extending from valve 4 on the outlet side, extends on the inlet side.

To the end that the valves may readily be removed and replaced without disturbance of the valve structure as a whole, when once that structure has been installed, the valves themselves are screw-threaded to their stems (as is common) and furthermore the valve stems are jointed at points external to the casing but short of the cam mechanism by which the stems are shifted. Joining is accomplished by removable pins 60, 70; and thus, a closure 30 or 31 being removed, and the pin 60 or 70 of the valve stem being removed, the corresponding valve may be withdrawn.

Simplification lies also in mounting the two cams upon a common shaft, rather than upon two shafts linked together.

Operation will readily be understood. The parts being in the position shown in Fig. II, both valves are free of restraint of the operating cams and both valves are closed. When now it is desired to establish communication through which water under pressure may enter the hydraulic cylinder through passageway 2, the lever 21 is shifted to the left (Fig. II). Thereupon, valve 5 remaining closed, valve 4 is opened, and the communication established. When the lever 21 is swung again to the intermediate neutral position (and it will of itself return to this position when released, if it has not been swung all the way to the limit of its leftward swing), both valves are closed; when the lever is swung to the right, valve 5 is opened, putting the cylinder in communication through passageway 2 with the waste 3, valve 4 remaining meanwhile closed.

I come now to consider the structure which is shown in Figs. III–V. The features of the structure of Figs. I and II already described are present here also. Correspondence of numbering will indicate that it includes a casing with inlet passage and waste passage, 1 and 3, and duplicate cylinder passages, $2^x$ and $2^y$. Within the casing there are four valves, two inlet valves, $4^a$ and $4^b$, controlling respectively communication from inlet 1 to the two cylinder passageways $2^x$ and $2^y$, and two relief valves $5^a$ and $5^b$, controlling respectively communication from the two cylinder passageways $2^x$ and $2^y$ to the waste 3. The four valves are arranged in the grouping best indicated in Fig. V, with partition walls properly disposed to afford the doubled communications already alluded to.

There are of necessity double cam shafts, $9^x$ and $9^y$, which may be linked together as shown and still operated by a common lever 21, and each shaft bears two cams, so that there are in all four cams, one for each valve. Cam $19^a$ engages the stem of valve $4^a$; $19^b$ the stem of $4^b$; $20^a$ that of $5^a$; and $20^b$ that of $5^b$.

The linking together of the two cam shafts brings about this arrangement: there are still three effective positions of hand lever 21; neutral, in which all valves are closed; but the other two positions are at one and the same time working positions and relief positions. The spaces within the valve chest above valves $4^a$ and $4^b$ (i. e. to the left, as seen in Fig. III) are always in communication with inlet 1, and, through the oblique space 40 (Fig. V), with one another; the spaces above valves $5^a$ and $5^b$ are always in direct communication the one with cylinder passage $2^x$, the other with cylinder passage $2^y$; the spaces beneath valves $5^a$ and $5^b$ are always in communication one with the other through the vertical opening indicated in dotted lines in Fig. III at 32, and always in communication both of them with the waste passageway 3; the spaces beneath valves $4^a$ and $4^b$ are through the diagonal spaces 41 (Fig. IV) in direct communication the one with cylinder passageway $2^x$, the other with cylinder passageway $2^y$. When lever 21 is swung to the left (Fig. III) cam $19^a$ opens valve $4^a$ and $20^a$ opens $5^a$, while at the same time valves $4^b$ and $5^b$ remain closed. In this position water under pressure passes to the cylinder through valve $4^a$, thence upward and across, through the space marked 41 in Fig. IV, to the cylinder passageway $2^x$, while from the other end of the cylinder water escapes to waste through passageway $2^y$ and valve $5^a$. When lever 21 is swung from neutral to the right, it is valves $4^b$ and $5^b$ which are opened, valves $4^a$ and $5^a$ remaining closed, and then the communications through the cylinder passageways are reversed.

These are the characteristics of the arrangement of the valves: Each as has been said opens against the current; accordingly, each is surrounded by an encircling intake space, and from each a central outflow space leads away. The four valves are grouped in the quadrangular arrangement, best shown in Fig. V; the valves are arranged in pairs, the inlet valves standing diagonally opposed on one diagonal of the quadrangle, and the two relief valves diagonally opposed on the other diagonal; and simultaneous operating inlet and relief valves being vertically alined. The valves so arranged are contained within an essentially cubical casing; through the base wall of the cube the inlet and outlet passageways extend, and through one of the end walls of the cube the cylinder passageways extend. Within the cubical chamber the inlet passageway 1 is in communication with both intake valves $4^a$ and $4^b$, by virtue of an interconnecting space 40, best shown in Fig. V. On the intake side, communication from the inlet passageway through valve $4^a$ is to cylinder passageway $2^y$, and through valve $4^b$ to cylinder passageway $2^x$. From cylinder passageway $2^x$ valve $5^a$ controls a port which leads through vertical space 32 to waste passageway 3, while from cylinder passageway $2^y$ valve $5^b$ controls a port leading at a lower level to waste passageway 3.

Turning again to Figs. I and II, it will be remarked that there too the valve mechanism is included in an essentially cubical casing; that inlet and waste passages communicate through the base of the cube, while cylinder communication is established through one of the end walls. Figs. III and V show two valve structures such as shown in Figs. I and II superposed; the side by side arrangement is in the superposed set reversed; the cylinder passageways are duplicated; and, when either valve of either vertical pair is active, both are—one of the pair opening communication with one cylinder passage, and the other with the other.

Variation in detail is of course permissible, and are immaterial, so long as the structure is covered by the claims.

I claim as my invention:

1. A valve structure for an hydraulic cylinder consisting of an essentially cubical casing provided at its base with inlet and waste passages, and in one end with a cylinder passage, two valves arranged within the casing and controlling one of them the line of flow from the inlet passage to the cylinder passage and the other the line of flow from the cylinder passage to the waste passage, said valves being carried upon the stems extending through the end of the casing opposite that wherein the cylinder passage is formed, means for engaging said valve stems for shifting the valves, two openings normally covered with removable closures formed in the end of the casing in which the cylinder passage also is formed, said openings affording access to the said valves for purposes of removal and replacement, substantially as described.

2. A valve structure for an hydraulic cylinder consisting of an essentially cubical casing provided in its base with inlet and waste passages and in one end with two cylinder passages, and a valve mechanism within said casing and controlling flow from inlet passage to either of said cylinder passages and from the other of said cylinder passages to said waste passage, said valve mechanism adapted to occupy any one of three positions: neutral, when all flow is cut off, and alternate working positions when inlet is to one or the other of the cylinder passages and waste is from the opposite cylinder passage, substantially as described.

3. A four-way valve structure for an hydraulic cylinder consisting of an essentially cubical casing having four controlling valves quadrangularly arranged side by side within the casing, inlet and outlet passageways and two cylinder passageways all disposed in a common plane, medial with respect to said casing, two of said passageways, the inlet and the waste, opening through one face of said cube and the two cylinder passageways opening through an adjacent face, and partition walls within said chamber dividing the space within into conduits controlled by said valves, the arrangement being such that the valves being opened in pairs the inlet enters one cylinder passageway and the other cylinder passageway vents to said waste passageway, and the flow being reversed in said cylinder passageways according as one pair of valves or the other is opened, substantially as described.

4. A four-way valve structure for an hydraulic cylinder consisting of an essentially cubical casing having four controlling valves quadrangularly arranged side by side within the casing, inlet and outlet passageways and two cylinder passageways all disposed in a common plane, medial with respect to said casing, two of said passageways, the inlet and the waste, opening through one face of said cube and the two cylinder passageways opening through an adjacent face, and partition walls within said chamber dividing the space within into conduits controlled by said valves, the arrangement being such that the valves being opened in pairs the inlet enters one cylinder passageway and the other cylinder passageway vents to said waste passageway, and the flow being reversed in said cylinder passageways according as one pair of valves or the other is opened, and means for operating said valves, pair by pair, at pleasure, substantially as described.

5. A four-way valve structure for an hydraulic cylinder consisting of an essentially cubical casing having four controlling valves quadrangularly arranged side by side within the casing, inlet and outlet passageways and two cylinder passageways all disposed in a common plane, medial with respect to said casing, two of said passageways, the inlet and the waste, opening through one face of said cube and the two cylinder passageways opening through an adjacent face, and partition walls within said chamber dividing the space within into conduits controlled by said valves, the arrangement being such that the valves being opened in pairs the inlet enters one cylinder passageway and the other cylinder passageway vents to said waste passageway, and the flow being reversed in said cylinder passageways according as one pair of valves or the other is opened, and means arranged externally of said casing upon the face thereof opposite that in which the cylinder passageways are formed for operating said valves pair by pair, with neutral and closed position between the opposite active positions, substantially as described.

In testimony whereof I have hereunto set my hand.

GEORGE P. DEMPLER.

Witness:
FRANCIS J. TOMASSON.